United States Patent
Freeman et al.

(10) Patent No.: US 6,631,113 B1
(45) Date of Patent: Oct. 7, 2003

(54) CONTINUOUS FLEXIBLE CONNECTION METHOD FOR MINIATURE OPTICAL HEAD

(75) Inventors: Robert D. Freeman, Erie, CO (US); Scott D. Abrahamson, Longmont, CO (US); Thomas E. Berg, Fort Collins, CO (US)

(73) Assignee: DPHI Acquisitions, Inc., Boulder, CO (US)

( * ) Notice: Subject to any disclaimer, the term of this patent is extended or adjusted under 35 U.S.C. 154(b) by 373 days.

(21) Appl. No.: 09/679,941

(22) Filed: Oct. 4, 2000

(51) Int. Cl.[7] .................................................. G11B 7/00
(52) U.S. Cl. .............................. 369/112.01; 369/112.28; 369/44.11
(58) Field of Search .......................... 369/44.11, 44.12, 369/112.01, 99, 113, 112.28, 44.19, 44.14, 44.21

(56) References Cited

U.S. PATENT DOCUMENTS

| | | | |
|---|---|---|---|
| 4,965,684 A | 10/1990 | Stefansky | 360/78.12 |
| 5,010,246 A | 4/1991 | Tsuyuguchi et al. | 250/216 |
| 5,351,229 A * | 9/1994 | Brezoczky et al. | 369/99 |
| 5,805,377 A * | 9/1998 | Lerdal et al. | 360/97.01 |
| 6,052,357 A | 4/2000 | Ogawa et al. | 369/215 |
| 6,104,690 A * | 8/2000 | Feldman et al. | 369/112 |

FOREIGN PATENT DOCUMENTS

EP     0 862 168     9/1998     ............ G11B/7/085

* cited by examiner

Primary Examiner—Nabil Hindi
(74) Attorney, Agent, or Firm—MacPherson Kwok Chen & Heid LLP

(57) ABSTRACT

An optical pickup assembly includes an optical pickup unit (OPU) and a flex circuit. The OPU is mounted atop a thermally conductive plate through a cutout of the flex circuit. Bond wires couple contacts pads on the OPU and the flex circuit. Alternatively, OPU is mounted atop the plate and the plate is mounted atop the flex circuit. The plate includes a cutout where bond wires pass through to couple the contact pads on the OPU and the flex circuit.

13 Claims, 6 Drawing Sheets

CONTINUOUS FLEXIBLE CONNECTION METHOD FOR MINIATURE OPTICAL HEAD

CROSS-REFERENCE TO RELATED APPLICATIONS

This application is related to application Ser. No. 09/457,104, filed Dec. 7, 1999, entitled "LOW PROFILE OPTICAL HEAD", application Ser. No. 09/544,370, filed Apr. 6, 2000, entitled "SYSTEM AND METHOD FOR ALIGNING COMPONENTS OF OPTICAL HEAD", and application Ser. No. 09/680,106, entitled "LASER THERMAL MANAGEMENT SYSTEM", which are commonly owned and incorporated by reference herein in their entirety.

BACKGROUND

1. Field of the Invention

The present invention relates to a system that connects an optical head to additional electronics in an optical drive.

2. Description of Related Art

A conventional optical drive (e.g., a compact disk player) typically includes a stationary optical unit, a movable optical unit, and an actuator. The stationary optical unit generally includes a laser diode, a half mirror, and a photodetector. The laser diode generates a light beam that is reflected by the half mirror onto the movable optical unit. The movable optical unit typically includes an objective lens that focuses the light beam on a spinning optical disk.

The actuator aligns the movable optical unit with the tracks of the optical disk so that the light beam reflects off the lands and pits of the tracks. The reflected light beam travels back through the movable optical unit and back to the stationary optical unit. The light beam is transmitted through the half mirror onto the photodetector where the varying intensity of the light is changed to electrical signals.

Optical drives are becoming smaller so they can be integrated into portable devices including laptop computers and personal digital assistants (PDAs). Close arrangement and integration of components help to miniaturize optical drives. For example, the stationary and movable optical units described above can be integrated into a single component (an integrated optical head) called "optical pickup unit" or "OPU". An actuator arm can then be used to place the OPU over the tracks of a spinning medium.

FIG. 1 illustrates an assembly 10 used to connect an OPU 20 to a printed circuit board 60 (or electronics of an optical drive). OPU 20 is mounted atop a copper plate 30 through a cutout of a fiberglass layer 40. Fiberglass layer 40 includes pad 42, pad 44, and trace 46. Pad 42 of fiberglass layer 40 is coupled to pad 22 of OPU 20 via a bond wire 25. Plate 30 is mounted atop a flexible circuit 50 (or vice versa). Flexible circuit 50 includes pad 52, trace 54, and a connector 56. Pad 44 of fiberglass layer 40 is coupled to pad 52 of flexible circuit 50 via a solder joint 35. Flexible circuit 50 is next coupled to a printed circuit board 60 via connector 56.

Assembly 10 has several disadvantages. Each of the wire bonds and solder joints in assembly 10 forms a point of failure that may break during use. Thus, the many wire bonds and solder joints in assembly 10 create multiple points of failure. Each of the wire bonds and solder joints must be formed during fabrication. Thus, the many wire bonds and solder joints increase fabrication cost. Solder joints also require large pads, thereby increasing the overall size of the fiberglass and flexible circuit layers. Assembly 10 is also constructed from multiple layers of silicon, fiberglass, copper, and flex circuit that increase the overall weight and volume of the optical drive. Accordingly, there is a need for a method and a system to connect the OPU to the remaining electronics of the optical drive while improving reliability and minimizing weight and volume.

SUMMARY

An optical assembly includes an optical head, an actuator an for positioning the optical head, and a flex circuit for carrying signals from the optical head. The flex circuit is coupled to the optical head by at least one wire. In one embodiment, the flex circuit carries signals from the optical head to a printed circuit board. In one implementation, the flex circuit also carries signals from the printed circuit to the optical head.

In one embodiment, the optical head is mounted atop a plate, the plate is mounted atop the flex circuit, and the wire couples a pad on the flex circuit to a pad on the optical head through a cutout in the plate. In another embodiment, the flex circuit is mounted atop a plate and the optical head is mounted atop the plate. In one implementation, the optical head is mounted atop the plate through a cutout of the flex circuit.

The optical assembly described above eliminates the use of an intermediate fiberglass layer, thereby improving reliability by reducing the number of wire bonds and conserving weigh and volume of the optical assembly.

BRIEF DESCRIPTION OF THE DRAWINGS

Use of the same reference symbols in different drawings indicates similar or identical items.

DETAILED DESCRIPTION

Figure 2A:
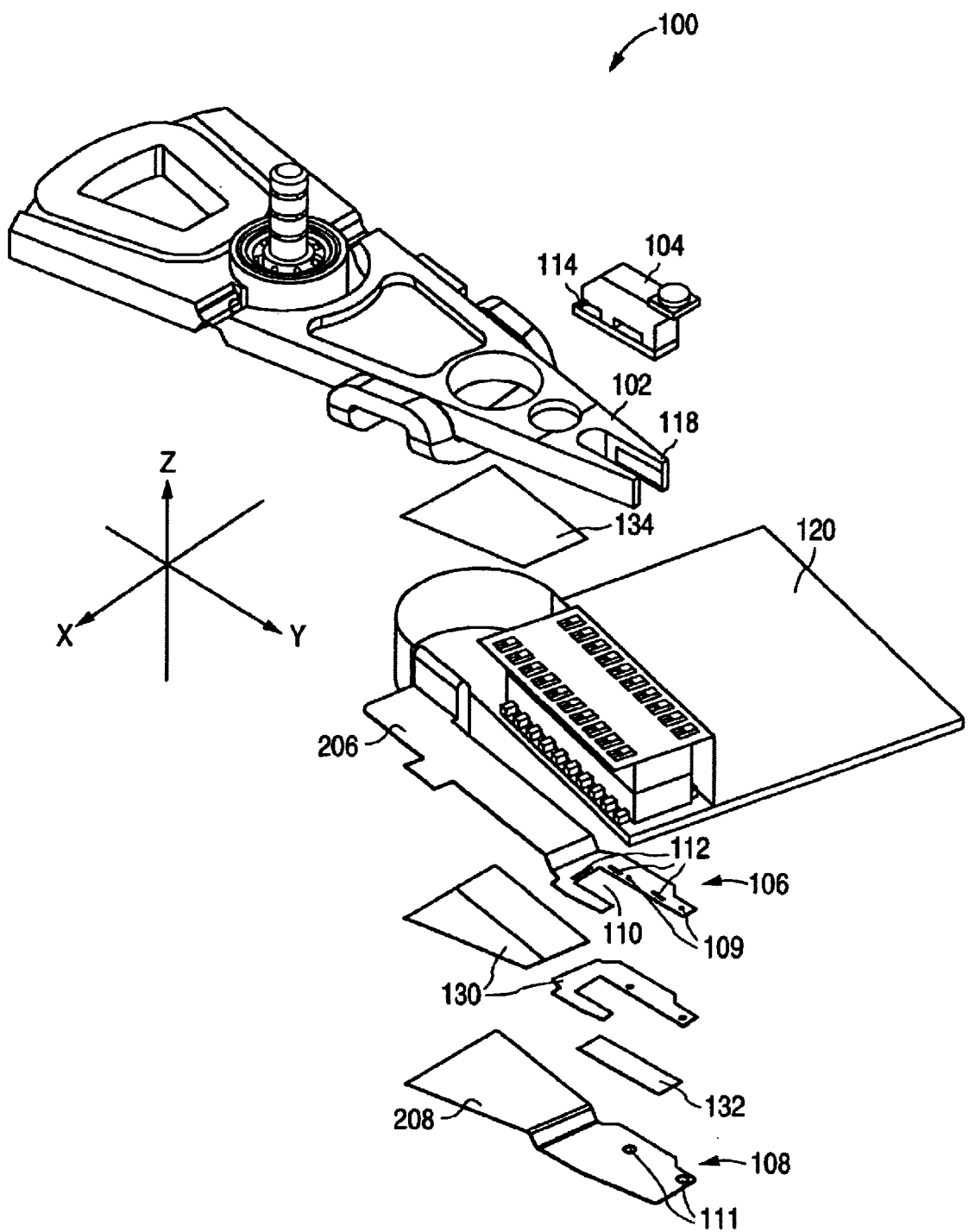
FIG. 2A illustrates an exploded view of an optical assembly in one embodiment.
Figure 2B:
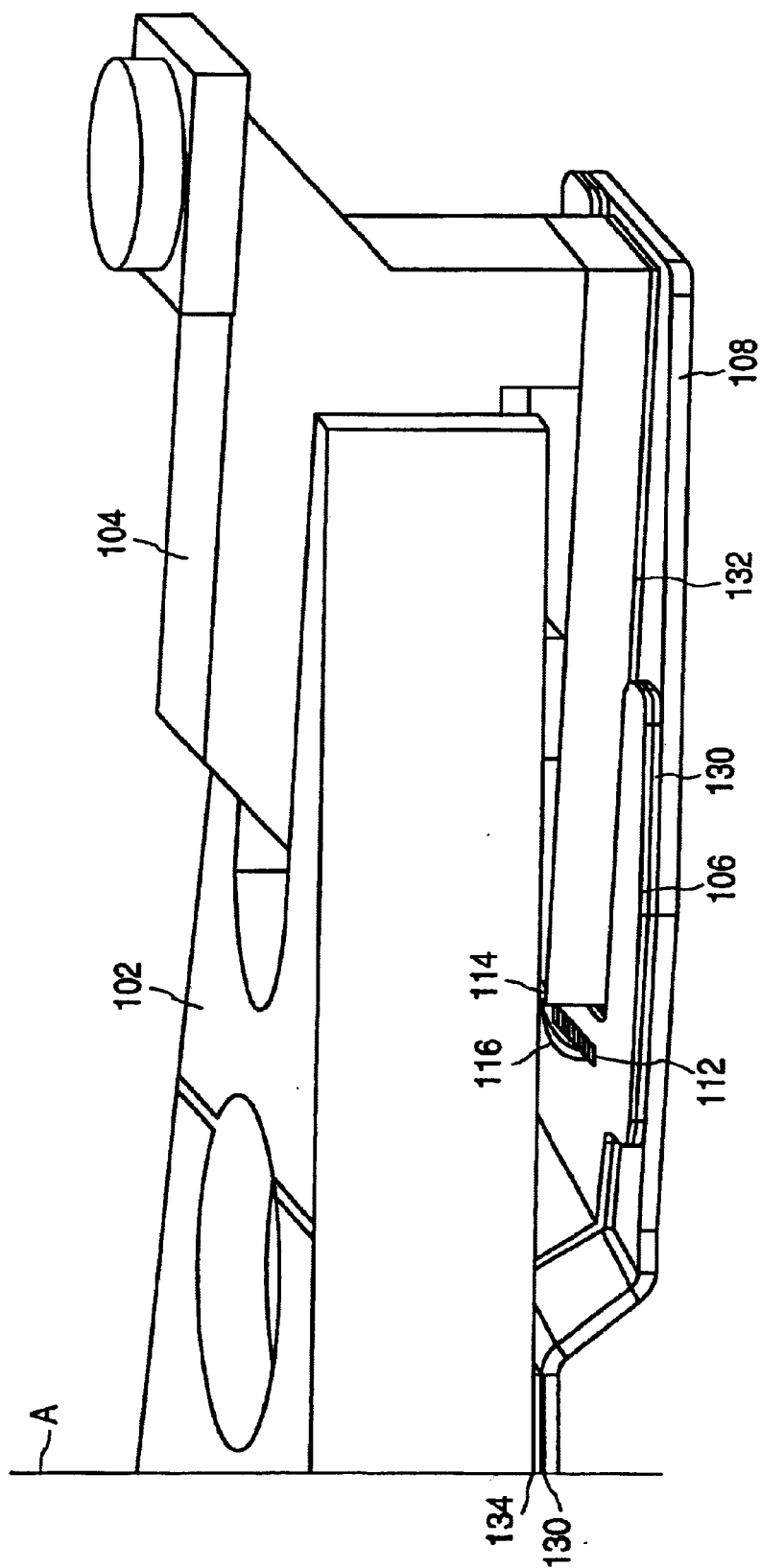
FIG. 2B illustrates a side view of the assembly of FIG. 2A.

FIGS. 2A and 2B illustrate an optical pickup assembly 100 in one embodiment. Assembly 100 includes an actuator arm 102 that places an optical pickup unit (OPU) 104 over the tracks of a spinning medium 330 (shown in FIG. 3). OPU 104 reflects a light beam off the tracks and converts the reflected light beam into electrical signals. A flexible circuit (flex circuit) 106 receives the electrical signals via a direct wire bond 116 to OPU 104 (shown in FIG. 2), thereby eliminating the use of an intermediate fiberglass layer and its associated wire bonds. Flex circuit 106 passes the electrical signals to a printed circuit board 120 (or any other electronics) for further processing. Flex circuit 106 also passes control and power signals from printed circuit board 120 to OPU 104. A thermally conductive plate (heat sink) 108 is mounted to OPU 104 to dissipate heat generated by OPU 104 to the surroundings (e.g., the surrounding air and components).

As shown in FIG. 2B, flex circuit 106 is mounted atop plate 108. Plate 108 can be made from various thermally conductive materials including aluminum, brass, carbon fiber composite, copper, gold, graphite, steel (stainless or otherwise with anti-corrosion treatment). One skilled in the art understands that plate 108 can also be made from alloys of the metals listed above. Flex circuit 106 is, for example, a conventional Kapton flex circuit with gold or copper traces. In some embodiments, flex circuit 106 is bonded to plate 108 using a thermally conductive adhesive 130. Adhesive 130 includes pressure sensitive adhesives, acrylic adhesives, epoxies, structural epoxies, anaerobic adhesives, UV curable adhesives, gap filling adhesives, and wicking adhesives. Adhesive 130 may include a filler for thermal and/or electrical conductivity purposes (e.g., metal powders, metal fibers, carbon powders, and carbon fibers). In some implementations, flex circuit 106 and plate 108 are manufactured with respective alignment holes 109 and 111 (FIG. 2A) to properly position flex circuit 106 with respect to plate 108 during mounting. Flex circuit 106 and plate 108 are properly positioned when corresponding alignment holes 109 and 111 are aligned.

In some embodiments, flex circuit 106 includes a cutout 110 (FIG. 2A). In these embodiments, OPU 104 is mounted atop plate 108 through cutout 110. OPU 104 is, for example, bonded to plate 108 using a thermally conductive adhesive 132. Thus, OPU 104 is fixedly attached to plate 108 and in a fixed position relative to flex circuit 106.

Figure 3:
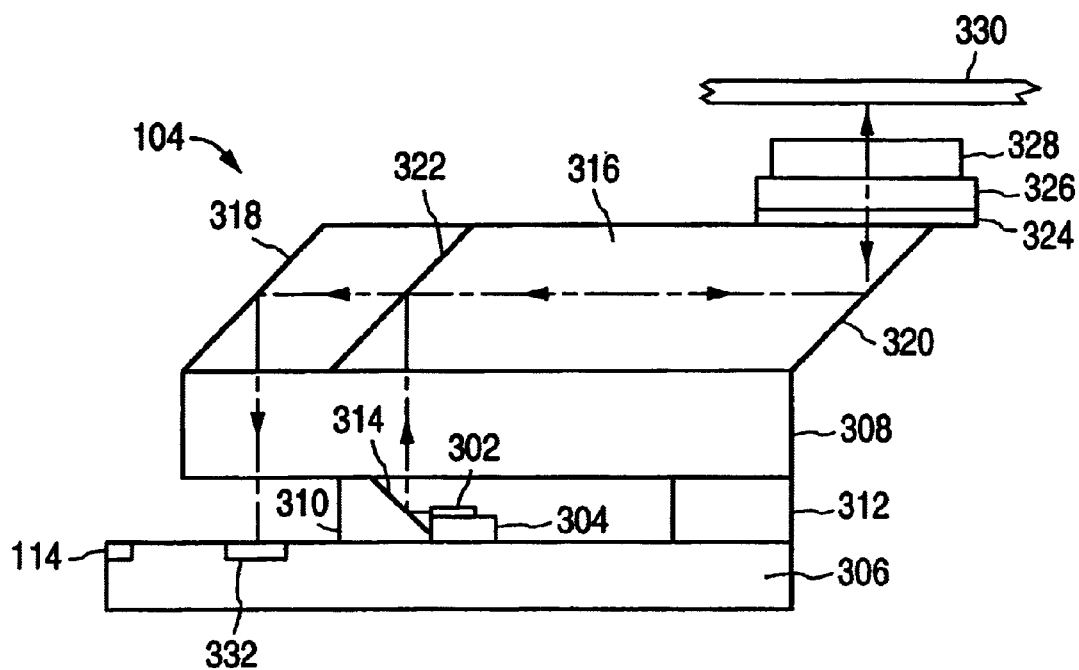
FIG. 3 illustrates a side view of an optical pickup unit (OPU) of the assembly of FIG. 2A.

As shown in FIG. 3, OPU 104 includes a light source 302 supported on a mount 304. Light source 302 is, for example, an edge-emitting laser diode. Mount 304 in turn is mounted on a sub-mount (wafer) 306. Sub-mount 306 is an integrated circuit chip formed in a semiconductor fabrication process to include photodetectors 332 for reading data and controlling the laser power and the servomechanism, and pads 114 and traces for wire bonding photodetectors 332, laser 302, and an oscillator chip used to modulate laser 302.

Above light source 302 is an OE (optical element) block 308, which can include lenses, gratings, holograms and other optical components or devices. OE block 308 diffracts a fraction of the laser light to laser power control photodetectors (not shown) and optionally shapes the laser beam. Interposed between sub-mount 306 and OE block 308 are spacer blocks 310 and 312 where one side of spacer block 310 is provided with a 45° turning mirror 314 that reflects the horizontal light beam produced by light source 302 to a vertical upward direction.

Mounted atop OE block 308 is a prism 316 made of a material that is transparent to the light beam emitted by light source 302. Prism 316 is, for example, made of fused silica or flint glass (SF2). The ends (lateral surfaces) of prism 316 are angled at about 45° to the horizontal and are coated with a substantially reflective coating such as aluminum or silver to form turning mirrors 318 and 320. Prism 316 also includes an internal polarization beam splitter surface (half mirror) 322 angled at about 45° with respect to the horizontal. Beam splitter surface 322 is substantially reflective (i.e., acts as a mirror) for light of a first polarization and substantially transmissive for light of a second polarization.

Mounted atop prism 316 are a quarter-wave plate 324, a lens spacer 326 and an objective lens 328. Also shown in FIG. 3 is a section of an optical medium 330 positioned at a predetermined distance from objective lens 328. As in conventional optical heat units, the light beam emitted by light source 302 follows a forward path to optical medium 330, where it is reflected along a return path to photodetectors 332 in sub-mount 306.

In some embodiments, sub-mount 306 is first mounted atop plate 108 through cutout 110 of flex circuit 106. A precision optical alignment tool can be used to position sub-mount 306 relative to plate 108 via tooling holes or reference surfaces formed in sub-mount 306 and plate 108. Subsequently, the other components of OPU 104 described above are mounted atop sub-mount 306. Again, a precision optical alignment tool can be used to position the components of OPU 104 during the assembly process. Additional details concerning OPU 104 are described in application Ser. No. 09/457,104, filed Dec. 7, 1999, entitled "Low Profile Optical Head", and application Ser. No. 09/544,370, filed Apr. 6, 2000, entitled "System and Method For Aligning Components of Optical Head", which are incorporated by reference herein in their entirety.

Referring back to FIGS. 2A and 2B, flex circuit 106 and OPU 104 include respective contact pads 112 and 114 for passing and receiving electrical signals via bond wires 116. Traces on flex circuit 106 are used to carry data, control, and power signals between OPU 104 and printed circuit board 120 of the optical drive. Thus, bond wires 116 provides direct connection between flex circuit 106 and OPU 104.

Figure 1:
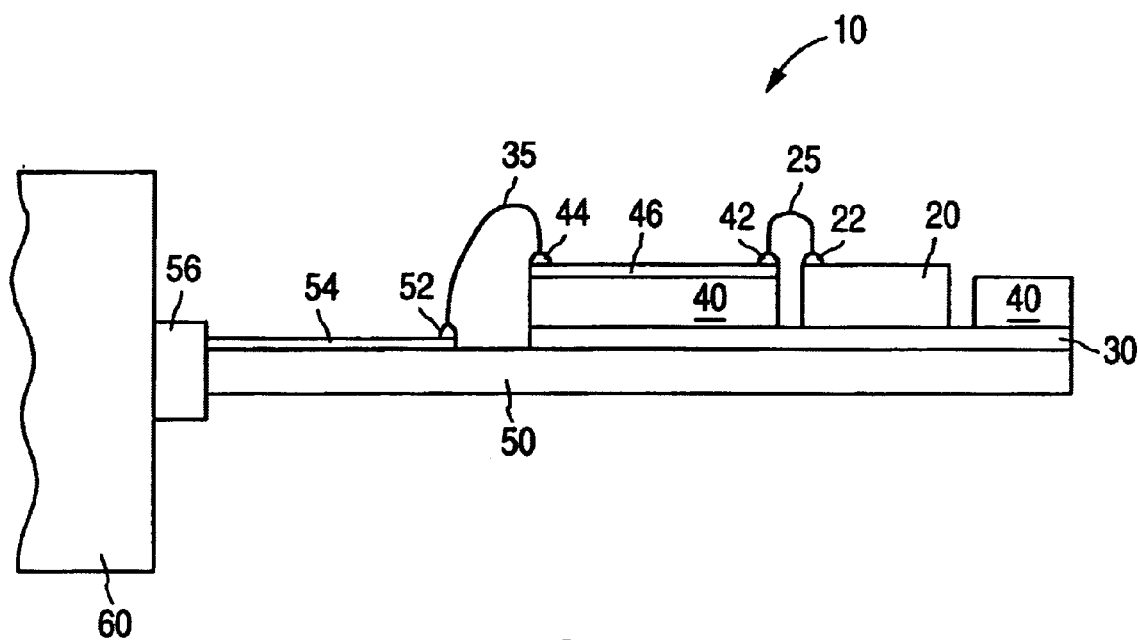
FIG. 1 illustrates a side view of an optical assembly.

The use of the direct wire bond between OPU 104 and flex circuit 106 increases interconnection reliability because there are no wire bonds to an intermediate layers (e.g., fiberglass layer 40 in FIG. 1) that can break. The use of the direct wire bond also helps to eliminate the intermediate layer, thereby conserving the overall weight and volume of the miniature optical drive. The elimination of the intermediate layer further conserves the weight of OPU 104 so that it can be easily manipulated by actuator arm 102.

OPU 104 is mounted to a fork 118 of actuator arm 102. OPU 104 is, for example, bonded to fork 118 using a thermally conductive adhesive. In some embodiments, OPU 104 is placed in its mounting position by locating one or more edges of sub-mount 306, OE block 308, or prism 316 with respect to the mating surface on actuator arm 102 in the x and y directions, and by locating the top surface of flex circuit 106 or plate 108 relative to the mating surface on actuator arm 102 in the z direction. Portions of plate 108 and flex circuit 106 are mounted to the bottom surface of actuator arm 102. For example, part 208 of plate 108 and part 206 of flex circuit 106 are bonded to the bottom surface of actuator arm 102 using a thermally conductive adhesive 134. As plate 108 and flex circuit 106 are mounted to OPU 104, they are properly positioned with respect to actuator arm 102 when OPU 104 is mounted to fork 118.

Figure 4A:
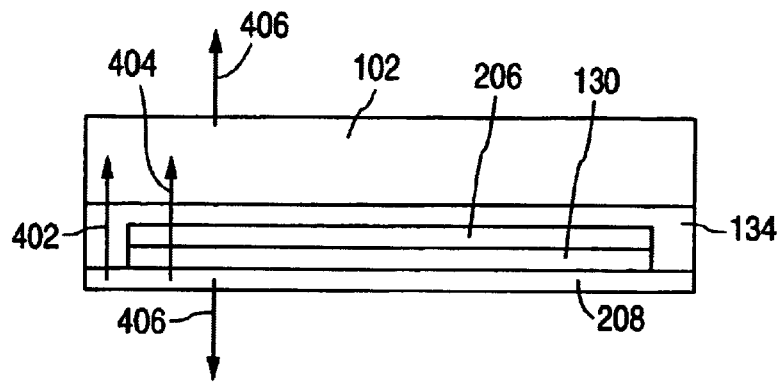
FIGS. 4A, 4B, 5A, and 5B illustrate cross sectional views of the assembly of FIG. 2A in various implementations.
Figure 4B:
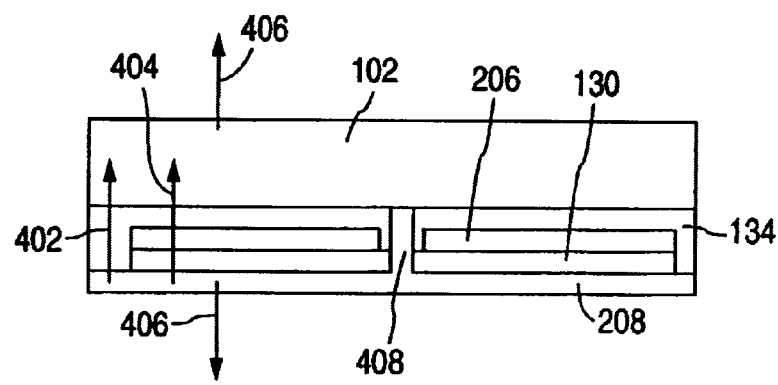

In some implementations, part 206 has a different shape than part 208 and a portion of part 208 is covered by part 206 when part 206 is mounted atop part 208. In these embodiments, thermally conductive adhesive 134 is applied over part 206 and the uncovered portion of part 208. FIG. 4A is a cross-sectional view of one implementation of assembly 100 along a line A (FIG. 2B). As shown in FIG. 4A, thermally conductive adhesive 134 provides a path 402 of thermal conduction between the uncovered portion of part 208 and actuator arm 102 when part 208 is bonded to the bottom surface of actuator arm 102. Of course, heat is also conducted from a path 404 between the covered portion of part 208 and actuator arm 102 through part 206. By forming conductive paths from OPU 104 to part 208 and actuator arm 102, heat can dissipate to the surroundings through the surface area of plate 208 and actuator arm 102 (e.g., shown as paths 406). In one implementation illustrated in FIG. 4B, plate 208 (or any other portion of plate 108) may be provided with one or more protrusions or tabs 408 that pass through cutouts in part 206 (or any other portion of flex circuit 106) to directly contact actuator arm 102 in order to provide additional conduction paths between plate 108 and actuator arm 102.

Figure 5A:
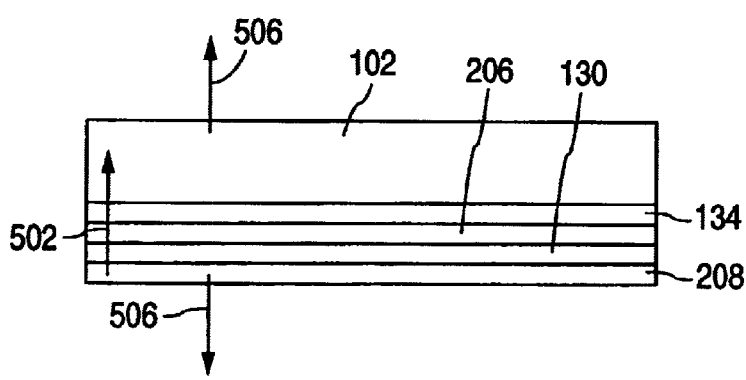
Figure 5B:
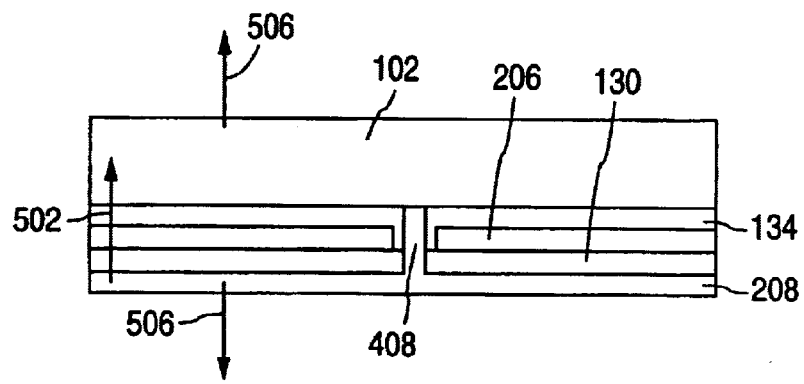

In other implementations, part 206 has a shape such that the entire part 208 is covered by part 206 when part 206 is mounted atop part 208. FIG. 5A is a cross-sectional view of one implementation of assembly 100 along a line A (FIG. 2B). As shown in FIG. 5A, part 208 only contacts actuator arm 102 through part 206. Thus, heat from OPU 104 can be conducted in a path 502 from part 208 of plate 108 through part 206 of flex circuit 106 into actuator arm 102. By forming conductive paths from OPU 104 to plate 108 and actuator arm 102, heat can dissipate to the surroundings through the surface area of plate 108 and actuator arm 102 (e.g., shown as paths 506). In one implementation illustrated in FIG. 5B, plate 208 (or any other portion of plate 108) may be provided with one or more protrusions or tabs 408 that pass through cutouts in part 206 (or any other portion of flex circuit 106) to directly contact actuator arm 102 in order to provide additional conduction paths between plate 108 and actuator arm 102.

Figure 6:
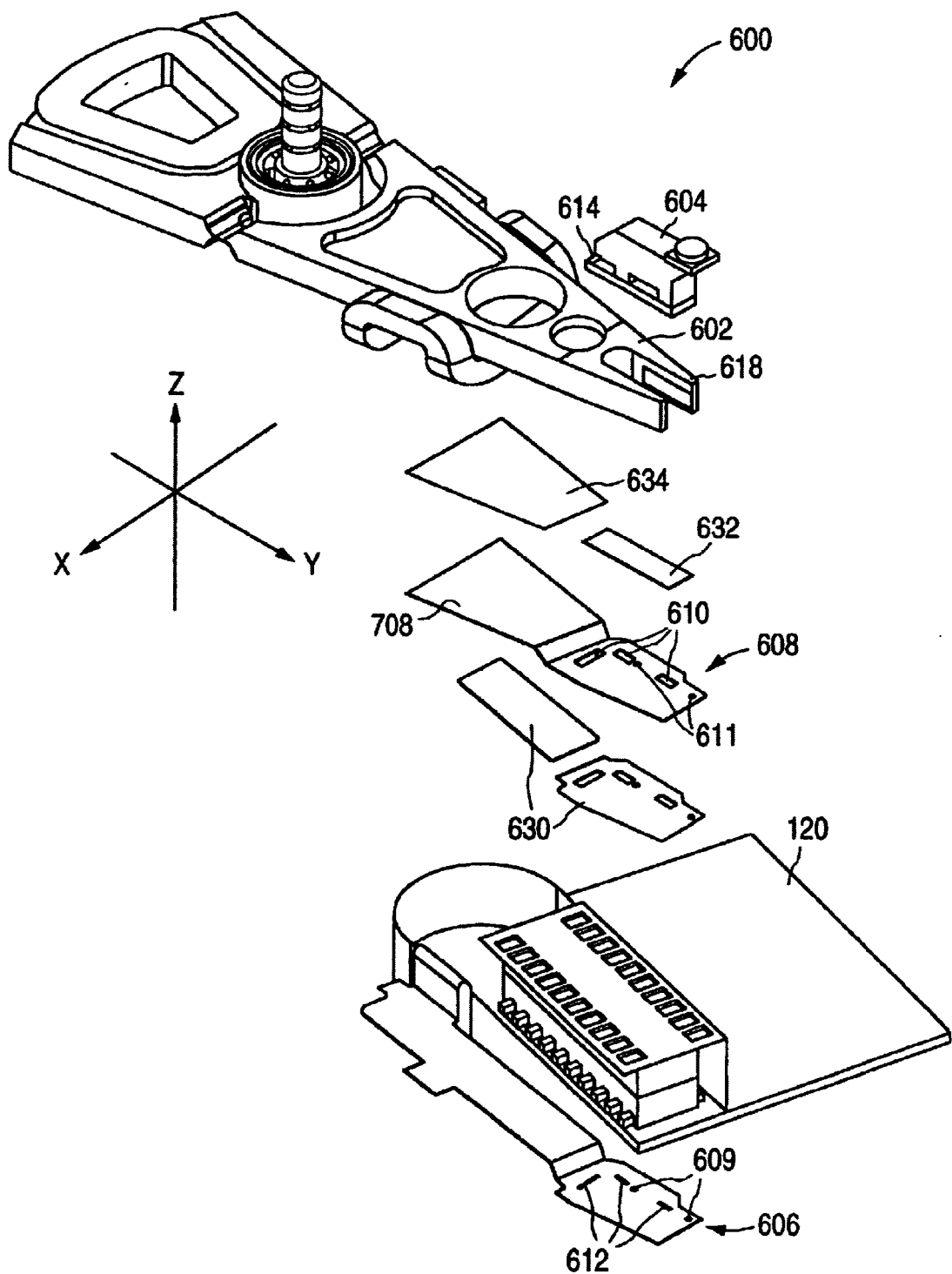
FIG. 6 illustrates an exploded view of an optical assembly in another embodiment.
Figure 7:
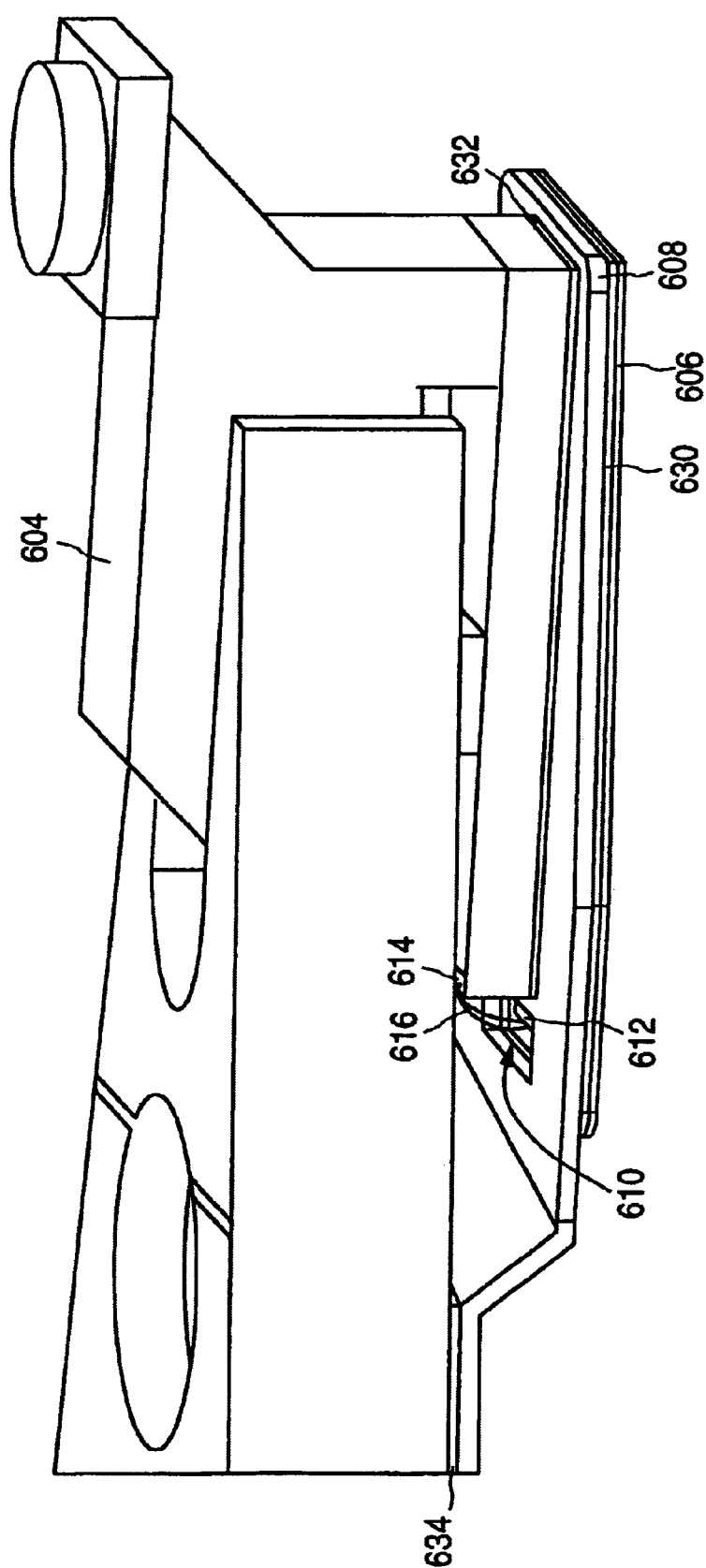
FIG. 7 illustrates a side view of the assembly of FIG. 6.

FIGS. 6 and 7 illustrate an optical pickup assembly 600 in another embodiment. Although similar to optical pickup assembly 100, the elements of optical pickup assembly 600 are arranged differently. A thermally conductive plate 608 is first mounted atop a flex circuit 606. Plate 608 is, for example, bonded atop flex circuit 606 using a thermally conductive adhesive 630. In some embodiments, flex circuit 606 and plate 608 are manufactured with respective alignment holes 609 and 611 to properly position flex circuit 606 with reference to plate 608 during mounting.

An OPU 604 is next mounted atop plate 608. OPU 604 is, for example, bonded to plate 608 using a thermally conductive adhesive 632. Thus, OPU 604 is fixedly attached to plate 608 and in a fixed position relative to flex circuit 606. In some implementations, OPU 604 is constructed like OPU 104.

Flex circuit 606 and OPU 604 include respective contact pads 612 and 614 for passing and receiving electrical signals via bond wires 616. In some embodiments, plate 608 includes cutouts 610 where bond wires 616 pass through to couple contact pads 612 and 614. Traces on flex circuit 606 are used to carry data, control, and power signals between OPU 604 and printed circuit board 120 of the optical drive.

OPU 604 is mounted to a fork 618 of an actuator arm 602. OPU 604 is, for example, bonded to fork 618 using a thermally conductive adhesive. Plate 608, with flex circuit 606 attached, is mounted to the bottom surface of actuator arm 602. For example, part 708 of plate 608 is bonded to the bottom surface of actuator arm 602 using a thermally conductive adhesive 634. OPU 604, flex circuit 606, and plate 608 may be positioned relative to each other as described above in respect to assembly 100.

Although the invention has been described with reference to particular embodiments, the description is only an example of the invention's application and should not be taken as a limitation. Various other adaptations and combinations of features of the embodiments disclosed are within the scope of the invention as defined by the following claims.

We claim:

1. An optical assembly comprising:
    an optical head including intermediate optics having a first mirror and a prism including a second mirror formed on a lateral surface of the prism, a third mirror formed on a lateral surface of the prism, and a half mirror intermediate of the second mirror and the third mirror formed within the prism;
    an actuator arm for positioning the optical head; and
    a flex circuit for carrying signals from the optical head, the flex circuit being coupled to the optical head by at least one wire.

2. The assembly of claim 1, wherein the flex circuit carries signals from the optical head to a printed circuit board.

3. The assembly of claim 2, wherein the flex circuit further carries signals from the printed circuit to the optical head.

4. The assembly of claim 1, further comprising a plate, wherein:
    the optical head is mounted atop the plate;
    the plate is mounted atop the flex circuit; and
    the wire couples a pad on the flex circuit to a pad on the optical head through a cutout in the plate.

5. The assembly of claim 4, further comprising a plate, wherein:
    the flex circuit is mounted atop the plate; and
    the optical head is mounted atop the plate.

6. The assembly of claim 5, wherein the optical head is mounted atop the plate through a cutout of the flex circuit.

7. The assembly of claim 1, wherein a portion of the flex circuit is mounted to the actuator arm.

8. The assembly of claim 4, wherein the optical head is mounted atop a first portion of the plate and at least a second portion of the plate is mounted to the actuator arm.

9. The assembly of claim 1, wherein the optical head is mounted to a fork of the actuator arm.

10. The assembly of claim 1, wherein the optical head comprises:
    a light source for emitting a light beam;
    an objective lens for directing the light beam; and
    an integrated circuit chip including a photodetector for sensing a reflected light beam.

11. The assembly of claim 10, wherein the light source is a laser diode.

12. The assembly of claim 10, wherein the light source is mounted atop the integrated circuit chip.

13. An optical assembly comprising:
    an optical head including:
        a light source for emitting a light beam,
        an objective lens for directing the light beam, and
        an integrated circuit chip including a photodetector for sensing a reflected light beam;
    an actuator arm for positioning the optical head; and
    a flex circuit for carrying signals from the optical head, the flex circuit being coupled to the optical head by at least one wire,
    wherein the optical head further includes intermediate optics passing the light beam through the objective lens and onto a moving medium, the intermediate optics further passing the reflected light beam from the moving medium onto the photodetector, wherein the intermediate optics include:
        a first mirror mounted atop the integrated circuit chip;
        an OE block mounted atop the first mirror;
        a prism mounted atop the OE block, the prism including a second mirror formed on a lateral surface of the prism, a third mirror formed on a lateral surface of the prism, and a half mirror intermediate of the second mirror and the third mirror formed within the prism; and
        a quarter wave plate mounted atop the prism block, wherein the objective lens is mounted atop the quarter wave plate.

* * * * *